W. N. AMSBARY.
REFRIGERATING APPARATUS.
APPLICATION FILED APR. 30, 1912.
1,056,964.
Patented Mar. 25, 1913.
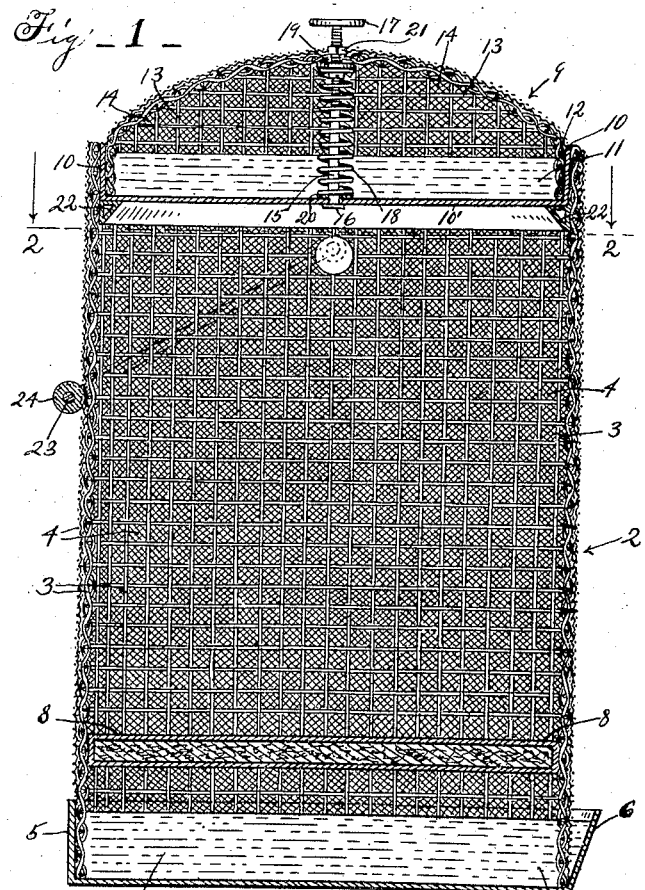
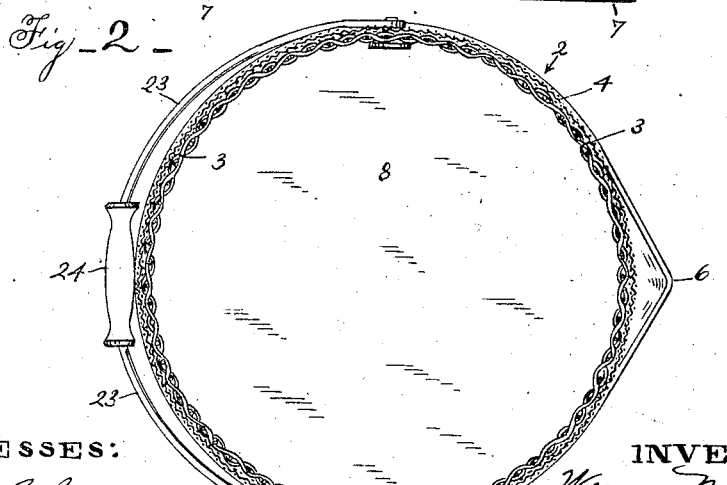
WITNESSES:
INVENTOR
William N. Amsbary
By
ATTORNEY

UNITED STATES PATENT OFFICE.

WILLIAM N. AMSBARY, OF LOS ANGELES, CALIFORNIA.

REFRIGERATING APPARATUS.

1,056,964.   Specification of Letters Patent.   Patented Mar. 25, 1913.

Application filed April 30, 1912. Serial No. 694,235.

*To all whom it may concern:*

Be it known that I, WILLIAM N. AMSBARY, a citizen of the United States of America, residing at Los Angeles, in the county of Los Angeles, State of California, have invented a certain new and useful Refrigerating Apparatus; and I do hereby declare the following to be a full, clear, and exact description of the invention, such as will enable others skilled in the art to which it appertains to make and use the same.

This invention relates to refrigerating apparatus; and it may be said to consist in the provision of the novel features and in the novel and improved construction, arrangement and combination of parts and devices therein as will be apparent from the description and claims which follow hereinafter.

Objects of the invention are to provide apparatus of the class specified which is light and easily portable, simple in character, economical to manufacture and maintain, and convenient and effective in use, Other objects and the advantages of the invention will be apparent to those skilled in the art from a consideration of the following description of the preferred form of apparatus embodying it, taken in connection with the accompanying drawings in which—

Figure 1 is a sectional view in elevation of refrigerating apparatus embodying the invention, and Fig. 2 is a cross-sectional view taken on the line 2—2 of Fig. 1.

The preferably circular casing 2 is formed of perforated or reticulated material, preferably wire netting, to provide an open framework 3 having thereon a covering 4 of suitable absorbent fabric. The lower end portion of the casing 2 may be fitted in a basin 5 into which water 7 or other suitable fluid may be poured through the spout 6. A suitable floor 8 is arranged on the interior of the casing 2 to have its under surface disposed at a level above that of the upper end of the basin 5 so that air may circulate freely through the portion of the casing 2 which is disposed between the floor 8 and the basin 5.

At the top of the casing 2 is fitted a suitable cover 9. As shown, the cover 9 may consist of a basin 10 adapted to hold water or other fluid 11 therein and having fitted therein the lower portion of the device 12 for cooling said water. The device 12 may consist of wire-netting 13 having thereon a covering of absorbent fabric 14. For convenience in handling the cover 9 a rod 15, having on its lower end the head 16 and on its upper end the handle 17, may be rotatably arranged in openings substantially centrally through the device 12 and the bottom 10' of the basin 10. In order to permit of readily separating the device 12 from the basin 10, a spring 18 may be interposed between the washers 19 and 20 loosely mounted on the rod 15 and respectively bearing against the underside of the device 12 and the upper side of the bottom 10' of the basin 10; the rod 15 being threaded through a nut 21 secured to the upper side of the device 12 so that by turning the handle 17 the device 12 may be raised from the basin 10, the spring 18 acting at the same time to separate the device 12 from the basin 10.

The cover 9 may rest on a suitable bracket 22 secured on the interior of the casing 2. A bail 23 may be affixed to the casing 2 and it has thereon the handle 24 for conveniently carrying the casing 2 when desired.

In use, the articles to be cooled having been placed on the floor 8 in the interior of the casing 2 and the cover 9 being placed in position on the top portion of the casing 2, the liquid in the basin 5 is continuously taken up by capillary attraction of the covering 4 of absorbent fabric of the casing 2. The evaporation of the liquid on the covering 4 effects a cooling of the casing 2 and consequently of the air and the articles on the interior of the casing, as will be readily understood.

Though only one form of construction embodying the invention has been particularly illustrated and described there are many changes and modifications thereof that will readily occur to those skilled in the art, wherefore the right is reserved to all such changes and modifications as do not depart from the spirit and scope of the invention as defined in the appended claims.

I claim:

1. Improved refrigerating apparatus, comprising a casing consisting of a perforated framework and a covering of absorbent material thereon, a basin adapted to hold fluid into which the lower end portion of said casing is fitted, a floor arranged in said casing above and spaced from the upper end of the basin, another basin adapted to hold fluid and fitted into the upper end portion of said casing, a covering for the last mentioned basin including absorbent material extending into the last mentioned basin, and a rod provided with a handle thereon and passing through the last mentioned covering and connected with the last mentioned basin.

2. In refrigerating apparatus, the combination of a casing consisting of a perforated framework and a covering of absorbent fabric thereon, a basin adapted to hold fluid into which the lower end portion of said casing is fitted, a floor arranged in said casing above the upper end of said basin, a basin adapted to hold fluid fitted on the upper end portion of said casing, a cooling device fitted in the last mentioned basin, said device consisting of a perforated framework and a covering of absorbent fabric thereon, a nut on said cover, a rod threaded through said nut and connected with the last mentioned basin, a handle on said rod, and a spring interposed between said cover and the last mentioned basin, substantially as and for the purposes set forth.

In testimony whereof, I have signed my name to this specification in the presence of two subscribing witnesses at Los Angeles, county of Los Angeles, State of California, this 23rd day of April A. D. 1912.

WILLIAM N. AMSBARY.

Witnesses:
HARRY A. BROOKS,
ALEX. H. LEDDERS.